United States Patent
Smith et al.

(10) Patent No.: US 8,091,948 B2
(45) Date of Patent: Jan. 10, 2012

(54) FLUSH-CLOSING WINDOW FOR MOTOR VEHICLES AND METHOD, GUIDE TRACK SYSTEM AND PIN ASSEMBLY THEREFOR

(75) Inventors: Mark L. Smith, Buchanan, MI (US); Todd E. Cripe, Goshen, IN (US); Bruce L. Drudge, Mishawaka, IN (US); Darren M. Grumm, Cassopolis, MI (US); Mark Mackenzie, Elkhart, IN (US); Eric Wong, Elkhart, IN (US)

(73) Assignee: Atwood Mobile Products, LLC, Elkhart, IN (US)

( * ) Notice: Subject to any disclaimer, the term of this patent is extended or adjusted under 35 U.S.C. 154(b) by 614 days.

(21) Appl. No.: 12/110,694

(22) Filed: Apr. 28, 2008

(65) Prior Publication Data

US 2009/0267382 A1 Oct. 29, 2009

(51) Int. Cl.
*B60J 1/00* (2006.01)
(52) U.S. Cl. .................. 296/146.16; 296/201
(58) Field of Classification Search .......... 296/146.15, 296/146.16, 201; 52/204.591, 208, 204.5, 52/204.593, 204.597, 204.595, 204.51, 204.67, 52/213, 202; 49/380, 381
See application file for complete search history.

(56) References Cited

U.S. PATENT DOCUMENTS

| | | | |
|---|---|---|---|
| 1,671,059 A | 5/1928 | Calpin |
| 1,726,002 A | 8/1929 | Smith |
| 1,795,561 A | 3/1931 | Kerr |
| 1,974,946 A | 9/1934 | Baughman |
| 2,017,299 A | 10/1935 | Vikre |
| 2,193,852 A | 3/1940 | Axe |
| 2,352,171 A | 6/1944 | Anfinson |
| 2,369,402 A | 2/1945 | Neely |
| 2,442,147 A | 5/1948 | Recklitis |
| 2,544,518 A | 3/1951 | Wintercorn |
| 2,585,118 A | 2/1952 | Hansen |
| 2,770,487 A | 11/1956 | Isbell |
| 2,829,911 A | 4/1958 | Green |
| 2,872,713 A | 2/1959 | Haas |
| 3,085,298 A | 4/1963 | Metzger |
| 3,321,234 A | 5/1967 | Harrell et al. |
| 3,438,166 A | 4/1969 | Bakke |
| 3,653,158 A | 4/1972 | Aue et al. |
| 3,923,339 A | 12/1975 | McDonald |

(Continued)

FOREIGN PATENT DOCUMENTS

DE 2038176 2/1970

(Continued)

*Primary Examiner* — Lori Lyjak
(74) *Attorney, Agent, or Firm* — Botkin & Hall, LLP

(57) ABSTRACT

A multi-pane flush closing window assembly for a vehicle that has a body enclosing a passenger compartment is secured in an opening in the vehicle body by a clamp ring fastened to the interior wall of the vehicle body. The improved window assembly includes at least one fixed sub-assembly and at least one sliding sub-assembly supported by a frame. The fixed sub-assembly has a sash, and removable fasteners extend through the peripheral edge of the sash into the interior side of the frame so that the fixed sub-assembly can be independently disassembled from the interior of the vehicle without removing the frame or the clamp ring. The sliding sub-assembly is removably secured to the frame by an improved multi-piece guide track and slide pin assembly that allows removal of the sliding sub-assembly without removing the frame. The slide pins are removably secured to opposite sides of the sliding sub-assembly.

8 Claims, 12 Drawing Sheets

U.S. PATENT DOCUMENTS

| | | |
|---|---|---|
| 4,124,054 A | 11/1978 | Spretnjak |
| 4,187,657 A | 2/1980 | Sukolics |
| 4,428,155 A | 1/1984 | Kwant et al. |
| 4,592,168 A | 6/1986 | Struckmeyer |
| 4,627,201 A | 12/1986 | Hamamoto et al. |
| 5,343,662 A | 9/1994 | Nelson |
| 5,442,880 A | 8/1995 | Gipson |
| 5,542,214 A | 8/1996 | Buening |
| 5,553,422 A | 9/1996 | Gazaway |
| 5,735,089 A | 4/1998 | Smith |
| 5,799,444 A | 9/1998 | Freimark et al. |
| 5,809,707 A | 9/1998 | Bargados et al. |
| 5,996,285 A | 12/1999 | Guillemet et al. |
| 6,047,500 A | 4/2000 | Caplette |
| 6,286,891 B1 * | 9/2001 | Gage et al. ............... 296/146.15 |
| 6,412,225 B1 | 7/2002 | McManus |
| 6,425,215 B2 | 7/2002 | Farrar |
| 6,829,868 B1 | 12/2004 | Frey |
| 6,832,457 B2 | 12/2004 | Geiger |
| 6,869,128 B2 * | 3/2005 | Farrar et al. ............... 296/146.15 |
| 6,871,902 B2 | 3/2005 | Carson et al. |
| 6,955,009 B2 | 10/2005 | Rasmussen |
| 7,017,304 B2 | 3/2006 | Bourque et al. |
| 7,073,293 B2 | 7/2006 | Galer |
| 7,080,874 B2 | 7/2006 | Farrar et al. |
| 7,150,126 B2 | 12/2006 | Rivera |
| 7,185,943 B2 | 3/2007 | Lesle et al. |
| 2005/0044798 A1 | 3/2005 | Daniel et al. |
| 2005/0050812 A1 | 3/2005 | Cameron |
| 2005/0110299 A1 | 5/2005 | Dankert et al. |
| 2005/0132532 A1 | 6/2005 | Campbell et al. |
| 2006/0107600 A1 | 5/2006 | Nestell et al. |
| 2007/0157522 A1 | 7/2007 | Hebert et al. |

FOREIGN PATENT DOCUMENTS

| | | |
|---|---|---|
| EP | 0 106 629 A1 | 4/1984 |
| GB | 715795 | 9/1954 |
| GB | 0979676 | 1/1965 |
| JP | 2006-161411 | 6/2006 |
| WO | WO 85/05401 | 12/1985 |

* cited by examiner

FLUSH-CLOSING WINDOW FOR MOTOR VEHICLES AND METHOD, GUIDE TRACK SYSTEM AND PIN ASSEMBLY THEREFOR

BACKGROUND OF THE INVENTION

1. Field of the Invention

This invention relates generally to window assemblies and, more particularly, to a flush-closing window for a motor vehicle that can be easily disassembled from the vehicle, an improved guide track system for directing movement of a sliding sub-assembly within the frame, and an assembly method for a flush-closing window.

2. Description of the Background of the Invention

Many vehicles, including busses, vans, trucks, RVs, and campers use sliding windows to improve air circulation within the passenger compartment. These window assemblies usually include at least one fixed sub-assembly and one or more sliding sub-assemblies supported within a frame. Industry trends appear to be moving toward windows having multiple panes that are flush when closed. The flush-closing windows create a sleek aesthetically appealing look. Flush-closing designs are also aerodynamically efficient, and it's more difficult for dirt and other matter to accumulate inside the frame.

There are numerous different types of securing structures for securing the frames of the windows in the opening in the vehicle body. One such structure includes the clamp ring. The clamp ring encircles the window opening and is secured to the interior wall inside the passenger compartment. The frame is typically held in the opening by fastening the interior side of the frame to the clamp ring. When the fixed and/or sliding sub-assemblies have to be removed from the frame for glass replacement, however, disassembly is a multi-step, time-consuming procedure. The sub-assemblies can only be separated from the frame after removing the frame and clamp ring or other structure from the vehicle body.

The clamp ring or other securing structure and frame are often ruined or defaced as a result. This is especially frustrating in the case of RV coach owners, for example, because many RV manufacturers paint vehicle window frames to match the corresponding vehicle exterior. Clamp rings and frames therefore have to be painted or replaced as part of the glass replacement job. Also, removal of the frame and sub-assemblies must be done from the exterior of the vehicle. Work in the field, therefore, is not possible under inclement weather conditions, and window repair usually must be done at the dealer's facility.

Flush-closing window designs may also include a track or guide in which a slide pin rides for directing movement of the sliding sub-assembly. Current track guides are comprised of a single piece and are often integrally cast with the window frame. Thus, multiple slide travel lengths are not possible. For each window assembly heretofore manufactured, a corresponding guide track is also made. This increases tooling and labor costs associated with window manufacture and replacement. Radius-cornered windows, for example, cannot be outfitted with a track guide for a square-cornered window.

Whether the window is configured for horizontal or vertical movement, the slide pins that engage the track present additional problems. The tolerance stack-up of pin components in the track can cause window fit and function problems. Nowhere is the problem of poor fit more visibly noticeable than in the case of flush-closing windows. Moreover, if tolerance adjustments are optimal following assembly, slide pins wear over time and eventually have to be replaced. Finally, servicing the sliding sub-assembly in the field would also be eased if such pins were conveniently removable and self-adjusting.

There, therefore, remains a need for an improved flush-closing window for a motor vehicle, which window has fixed and sliding sub-assemblies that can be conveniently secured to the frame member and removed from the frame member from inside the compartment without removing the frame member or other securing structure from the vehicle wall. There is also a need for an improved guide track system, pin assembly, and flush-closing window assembly method. The present invention is directed toward meeting this need.

SUMMARY OF THE INVENTION

The invention relates to a flush-closing window for a vehicle that has a body enclosing a passenger compartment. The window may be secured in an opening in the vehicle body by a clamp ring attached to an interior wall of the vehicle body. The window includes a frame member having an interior side for facing the interior of the compartment and an exterior side for facing the exterior of the compartment. At least one fixed sub-assembly is removably secured to the interior side of the frame member with removable fasteners. The fasteners are accessible from the interior side so that a user can conveniently secure to the frame member and remove from the frame member the fixed sub-assembly from inside the compartment without removing the clamp member from the vehicle wall. The window may include at least one sliding sub-assembly connected to the frame member which is capable of moving relative to the fixed sub-assembly between a closed flush position and an open offset position.

In another aspect of the invention, an assembly method for a flush-closing window is provided. The method includes providing a frame member for supporting at least one fixed sub-assembly and at least one sliding sub-assembly. The frame member includes an interior side for facing the interior of the compartment and an exterior side for facing the exterior of the compartment. The method may include securing the fixed sub-assembly to the interior side of the frame member with removable fasteners. The fasteners are accessible from the interior side so that a user can conveniently secure to the frame member and remove from the frame member the fixed sub-assembly from inside the compartment without removing the frame member or the clamp ring from the vehicle wall. The method may include mounting the sliding sub-assembly to the frame member so that the sliding sub-assembly can move relative to the fixed sub-assembly between a closed flush position and open offset position. The method may include securing more than one fixed sub-assembly to the frame member. The method may include mounting more than one sliding sub-assembly to the frame. The method may include assembling a window having only fixed sub-assemblies or only sliding sub-assemblies.

In yet another aspect, the invention includes a pin assembly for connecting a sliding sub-assembly to a frame member of a flush-closing window. The sliding sub-assembly includes a sash with a bore extending there through. The frame member includes a guide track. The pin assembly includes a shaft with a head and adjustable securing means for adjustably securing the pin in the bore of the sash to prevent axial movement of the shaft in the bore, and so that the head of the shaft can be adjusted to protrude a predetermined distance from the sash in order that the head may contact a surface inside the guide track to support and retain the sliding sub-assembly within the frame member to therefore define an optimal flush fit between the frame member and the sliding sub-assembly and between said sliding sub-assembly and a fixed sub-assembly also supported by the frame member. In another aspect, the slide pin may include a top portion with a bore. The top portion may be adapted to engage the bore in the sash in a flush manner so that the pin cannot rotate in the bore. A set screw received by the bore in the top portion joins the shaft and the head of the pin together and secures the pin in the bore of the sash to define a pre-set height at which the frame is distanced from the surface inside the guide track.

In still another aspect, a guide track system for guiding the movement of a sliding sub-assembly within a frame member of a flush-closing window for a vehicle is provided. The guide track system includes at least one lead guide track section, at least one tail guide track section, and at least one middle guide track section for connecting one end, respectively, of the lead and tail guide track sections. The lead section, and the tail section, and the middle section are each secured to the frame member by removable fasteners. The middle guide track section is measured and cut to correspond to a length between the lead and tail guide track sections. In another aspect of the guide track system, the lead guide track section, the tail guide track section, and the middle guide track section are formed as a single unit.

One object of the invention is to provide an improved flush-closing window, the fixed and sliding sub-assemblies of which window can be conveniently secured to and removed from the window's frame without removing the frame or securing structure typically used to hold the window in place in a vehicle. Related objects and advantages of the invention will be apparent from the following description.

DETAILED DESCRIPTION OF INVENTION

Figure 1:
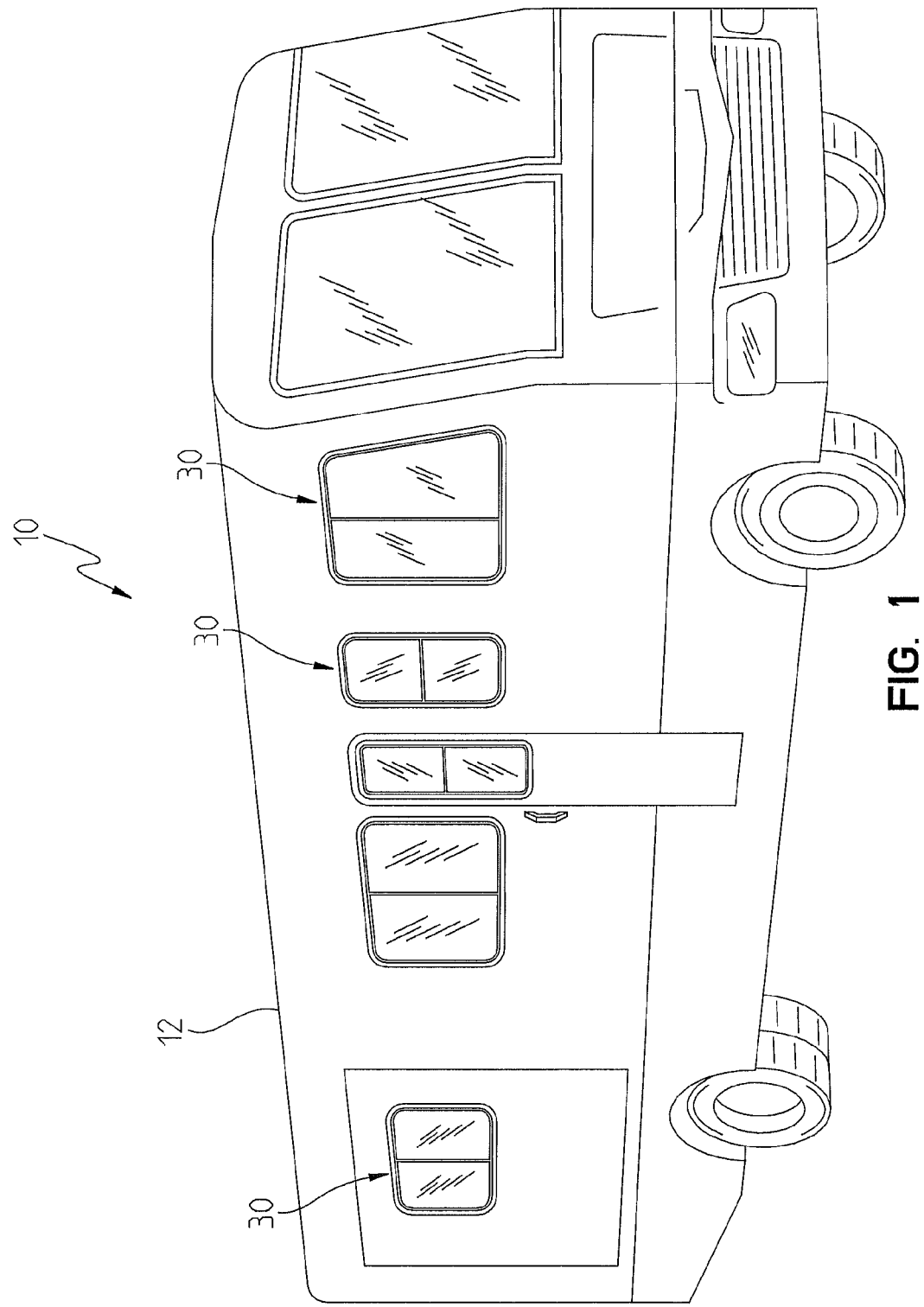
FIG. 1 is a perspective view showing horizontal and vertical flush-closing windows of the invention installed in a recreational vehicle.

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

FIGS. 1-4 illustrate potential commercial embodiments of the flush-closing window assembly invention 30, which may have one or more fixed sub-assemblies 50 and one or more sliding sub-assemblies 60. As shown in FIG. 1, the invention also contemplates different shapes and sizes of windows. Accordingly, the embodiments shown in the figures are for illustrative purposes only and should not be considered limiting to the application of the invention. The window assembly 30 of the invention is intended for any partitioned structure or enclosure and is especially suitable for vehicles that have a body enclosing a passenger compartment. The window assembly 30 can be configured for use in a van, pick up, bus, RV, trailer, and so on.

The example discussed in the description is a horizontal flush-closing window like one shown installed, for example, in the recreational vehicle 10 of FIG. 1. Referring to FIGS. 1-4, the window assembly 30 includes a rigid frame member 40 having an interior side 42 for facing the interior of the vehicle compartment or other enclosure and an exterior side 44 for facing the exterior. The frame may include a dividing member 46 extending across the opening of the frame for locking in place a sliding sub-assembly and/or other functions like supporting a screen 32. The frame 40 and the divider are preferably formed from a rigid material such as aluminum or steel. Drain holes 41 may be formed in the body of the frame member to drain rain water that can collect between the interior and exterior sides 42, 44.

Figure 5:
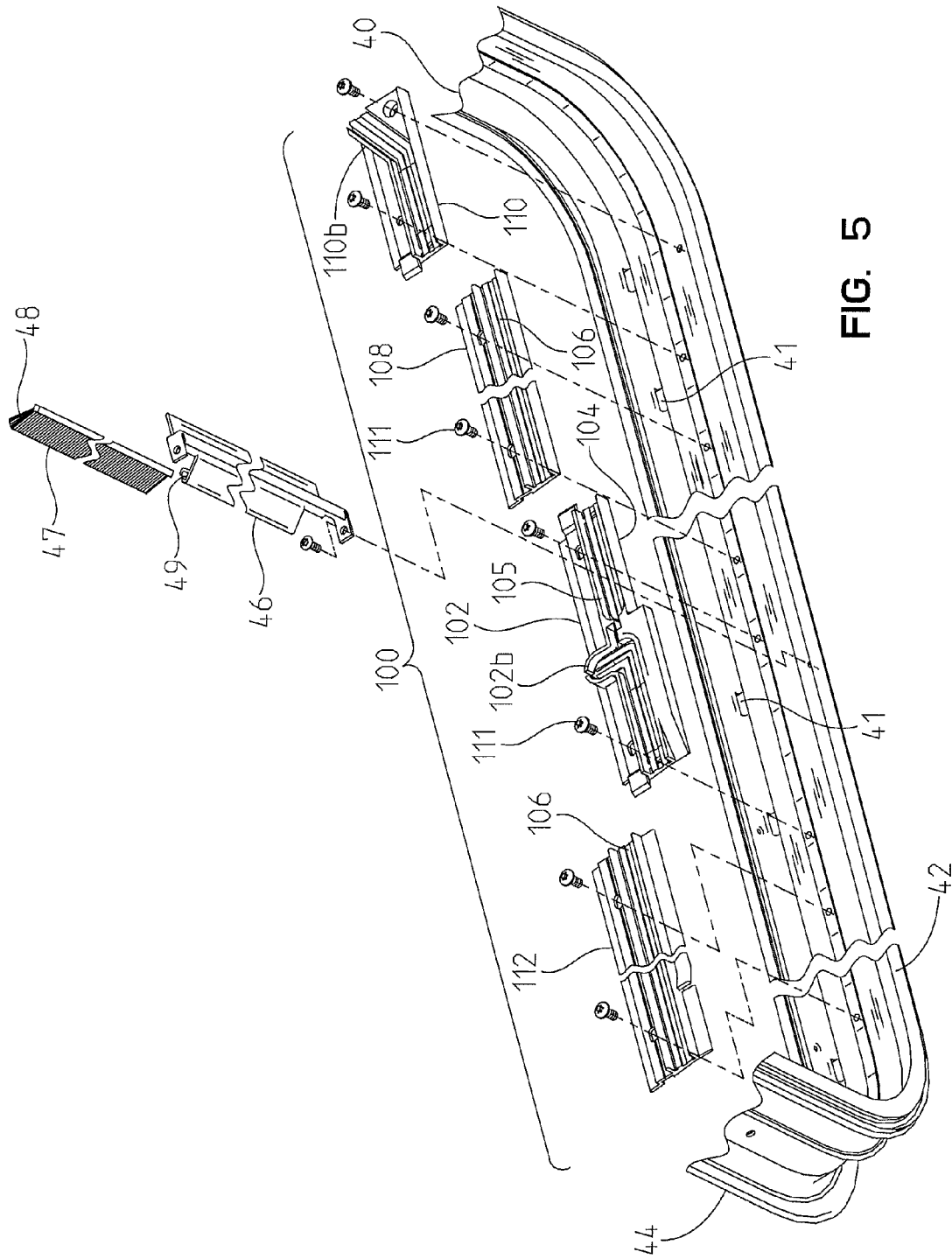
FIG. 5 is an elevated perspective partial view of an embodiment of the frame member of the invention showing the guide track system disassembled.

Sealing is provided along the length of the dividing member 46 in accordance with known techniques to prevent insects from entering the compartment when the sliding sub-assembly 60 is in the open position. In one embodiment, a brush seal 47 is shaped so as to be received in a complementarily-shaped channel 49 formed along the length of the dividing member 46, as shown in FIG. 5.

The frame 40 preferably defines a full-circumference about the outer perimeter of the assembly 30, which is advantageous in facilitating mounting and sealing the window assembly 30 as a single unit within an opening formed in the vehicle body 12. From a vehicle exterior point of reference, a right-side fixed sub-assembly 50 is secured to the interior side 42 of the frame member 40.

Figure 4:
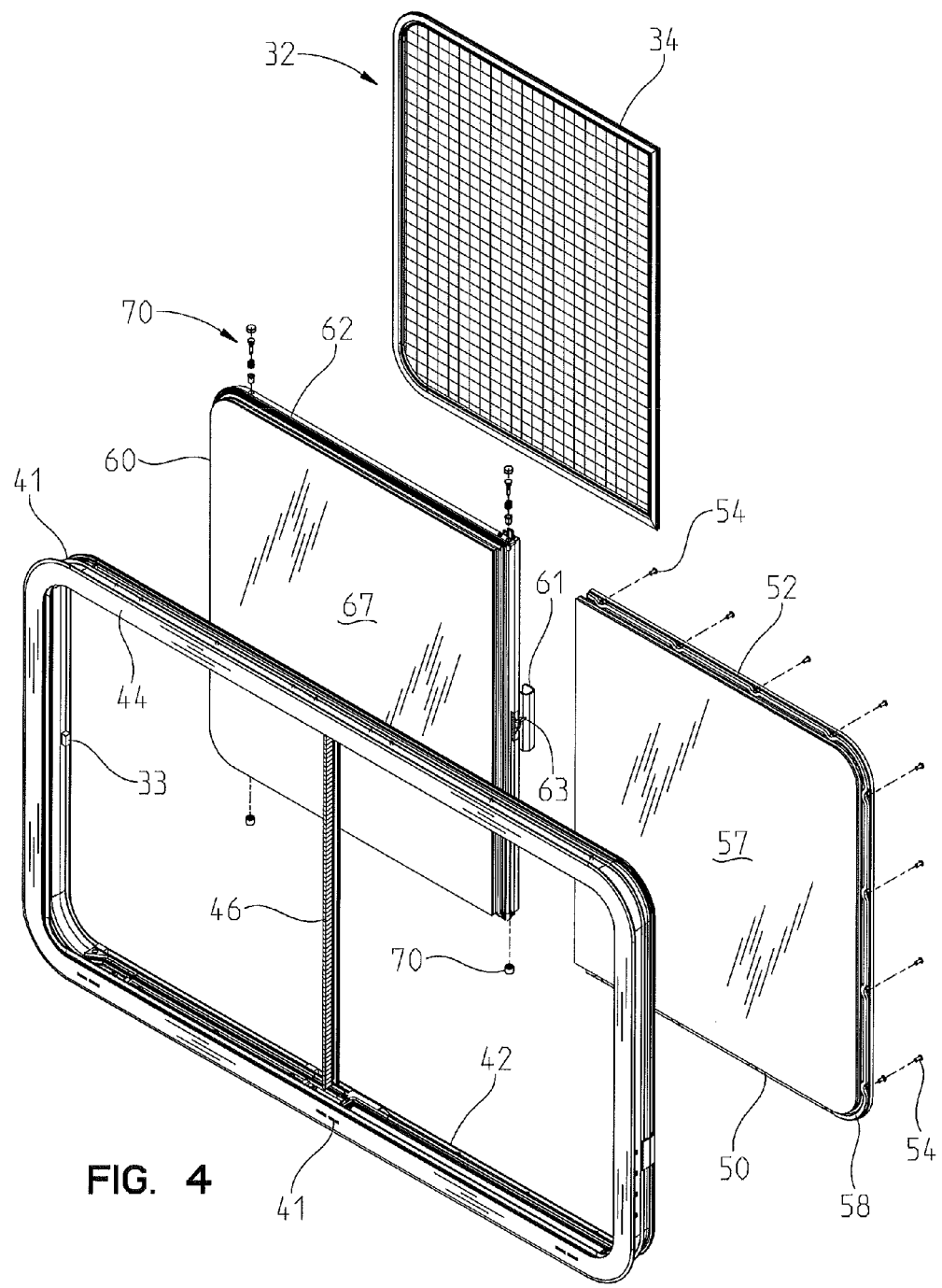
FIG. 4 is an elevated perspective view of an embodiment of the flush-closing window assembly of the invention showing the fixed and sliding sub-assemblies removed from the frame member.
Figure 8:
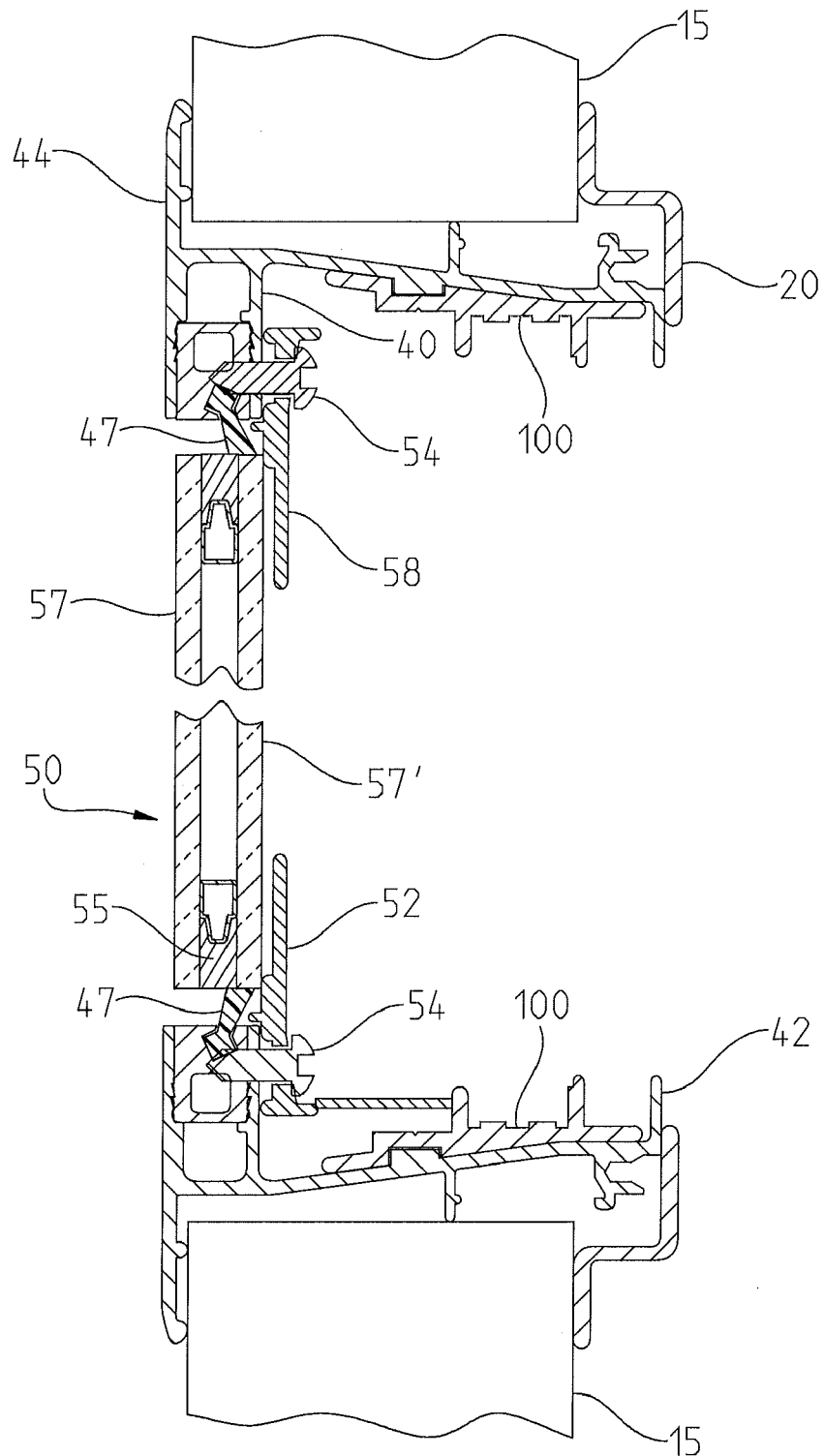
FIG. 8 is a plan cross sectional view of an embodiment of the flush-closing window of the invention taken along lines 8-8 of FIG. 2.

In the embodiment of FIG. 4, the fixed sub-assembly 50 has a sash 52 that includes a peripheral edge 58 that essentially frames three side edges of a pane, preferably a pair of spaced apart panes 57, 57'. The pane or panes may be formed from glass, plastic, or a laminate thereof or the like and are supported by an interior frame 55 using known techniques. Referring to FIG. 8, in one embodiment, the panes 57, 57' are secured, respectively, to the front and back surface of the interior frame 55 using adhesive, which is advantageous for mating the exterior glass pane 57 in close proximity with the exterior side 44 of the frame member 40 during assembly so that the frame member serves to frame the pane 57. This achieves a sleek aesthetically appealing appearance as a result.

Figure 2:
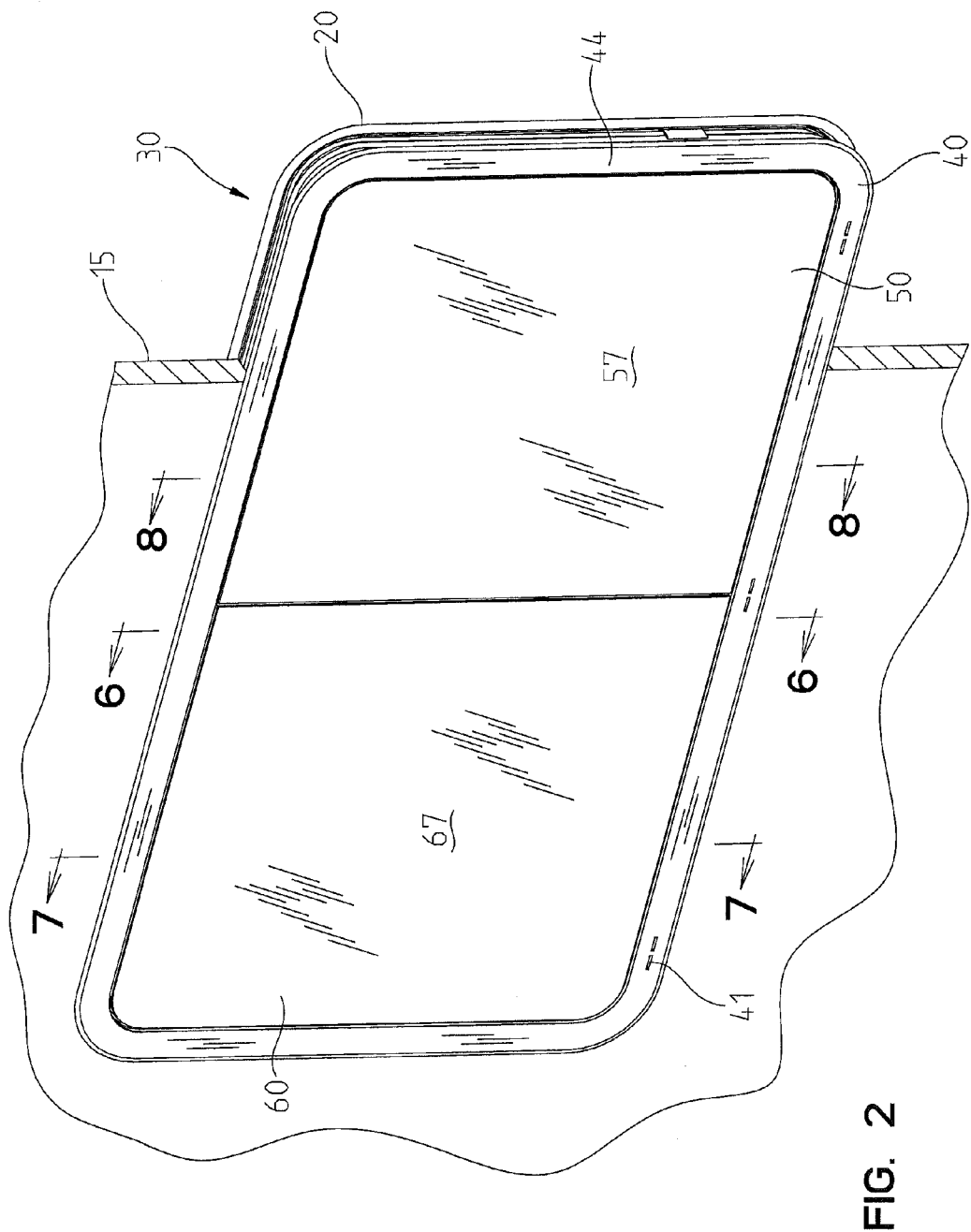
FIG. 2 is a perspective view of an embodiment of the flush-closing window of the invention shown secured to the wall of the vehicle body in the closed flush position.

With reference to all of the figures, the fixed sub-assembly 50 is secured to the frame 40 with removable fasteners, such as screws 54 or the like. The fasteners extend through the peripheral edge 58 of the sash 52 and into the interior side 42 of the frame 40. The screws 54 are, therefore, accessible from inside the compartment, and the fixed sub-assembly 50 can be easily removed without removing the frame 40 or other window securing structure, such as the clamp ring 20 from the vehicle wall 15, as shown in FIG. 2.

Figure 6:
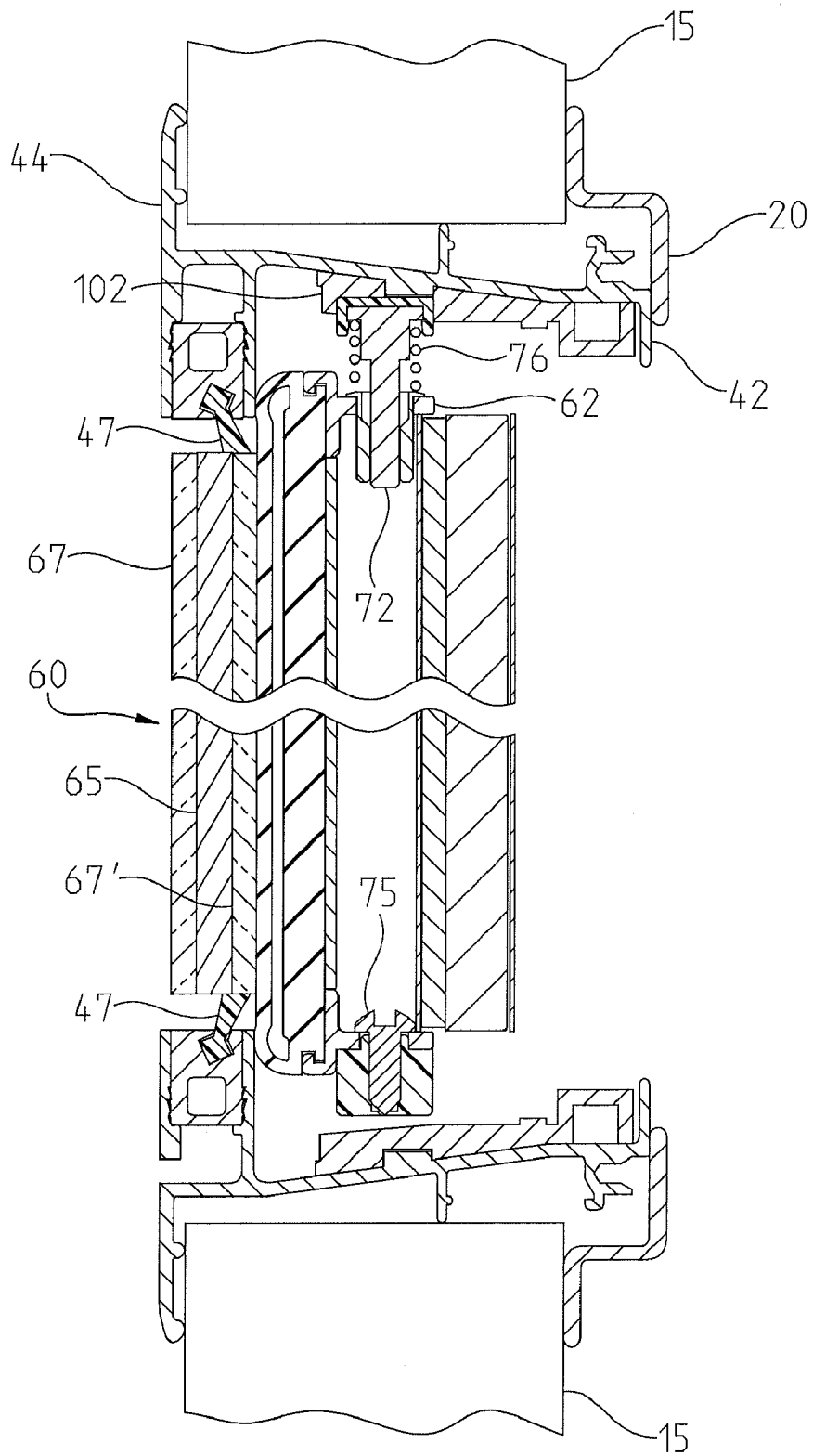
FIG. 6 is a plan cross sectional view of an embodiment of the flush-closing window of the invention taken along lines 6-6 of FIG. 2.
Figure 7:
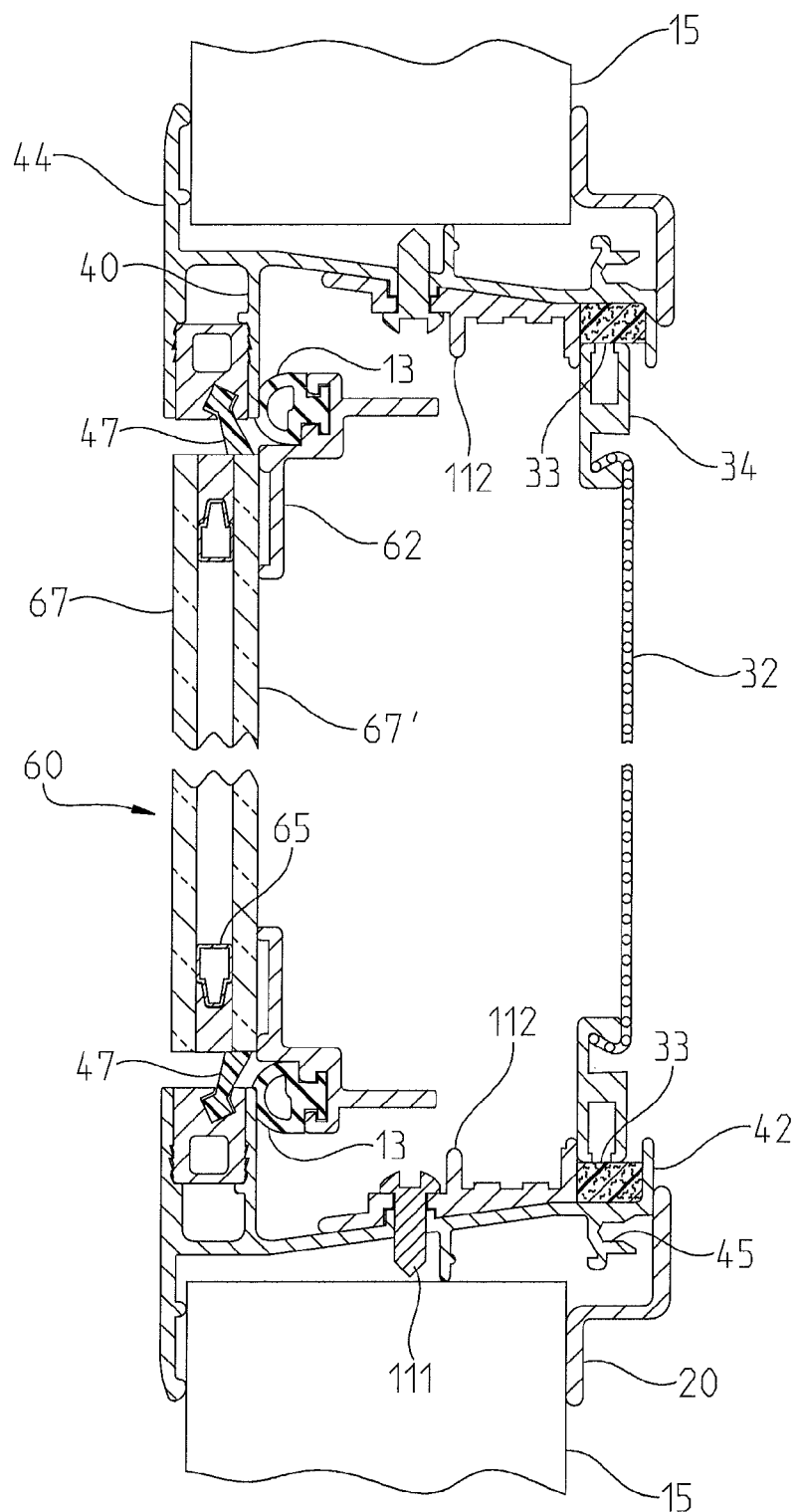
FIG. 7 is a plan cross sectional view of an embodiment of the flush-closing window of the invention taken along lines 7-7 of FIG. 2.

A left-side sliding sub-assembly 60 is also mounted to the interior side 42 of the frame member 40. Referring to FIG. 6, however, the sliding sub-assembly, or -assemblies can be configured to move up and down or side-to-side (example shown) and can be adapted to slide manually, as described below, for example, by means of a handle 61 attached directly to the sliding sub-assembly 60, or may be remotely driven by electric motor, hand crank, etc., using means known by skilled artisans. Those who are skilled in the art will be readily able to apply the general principles of the invention in alternative local and remote electromechanical drives. Referring to all the figures, in the example illustrated, the manually operated handle 61 includes a thumb lock 63 that actuates tabs 66 to engage and disengage from openings in the wall of the frame member 40.

The side-to-side fixed subassembly and the sliding subassembly embodiment described in this description is but one example of a particular combination. Skilled artisans should recognize that the subassemblies that are mounted in the frame in a flush fashion may include any one of a combination of subassemblies, a fixed subassembly with another fixed subassembly, for example, or a fixed subassembly with a sliding subassembly, or multiple ones of each of such subassemblies. The window, method, and other apparatus of the invention therefore should not be construed as limited to only a flush window arrangement that has one fixed subassembly and one sliding subassembly. The sliding sub-assembly 60 is mounted to the frame 40 with removable slide pins 70 and has a sash 62 with an exterior surface 64. The sash 62 of the sliding sub-assembly includes an interior frame 65, which supports glass panes 67, 67' as described above with respect to the fixed sub-assembly 50. The sash 62 also has bores 68 for receiving the slide pins 70.

Figure 10:
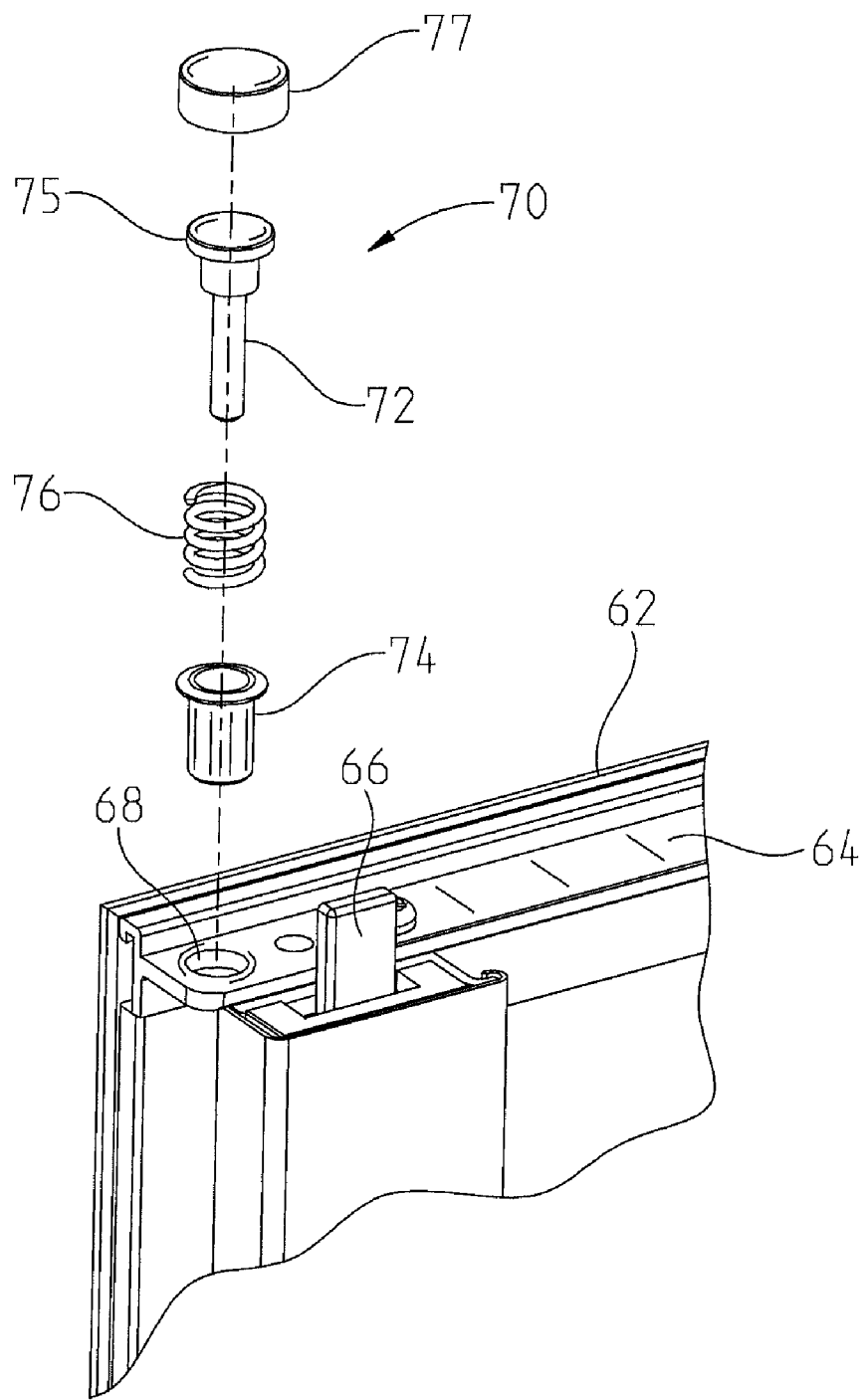
FIG. 10 is a partial cut away perspective view of an embodiment of the sash of the sliding sub-assembly of the invention showing one embodiment of the slide pin assembly.
Figure 11:
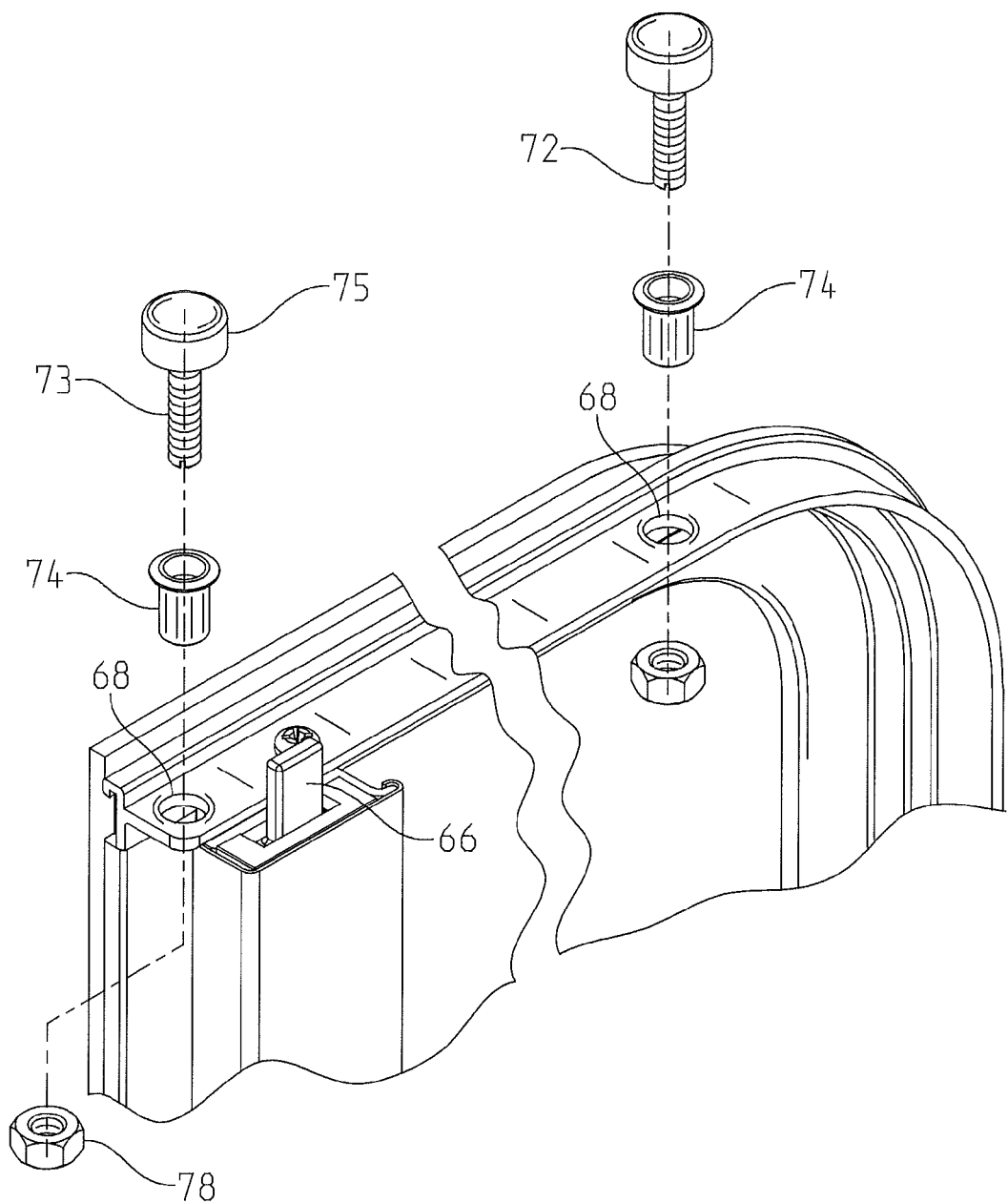
FIG. 11 is a partial cut away perspective view of an embodiment of the sash of the sliding sub-assembly of the invention showing another embodiment of the slide pin assembly.
Figure 12:
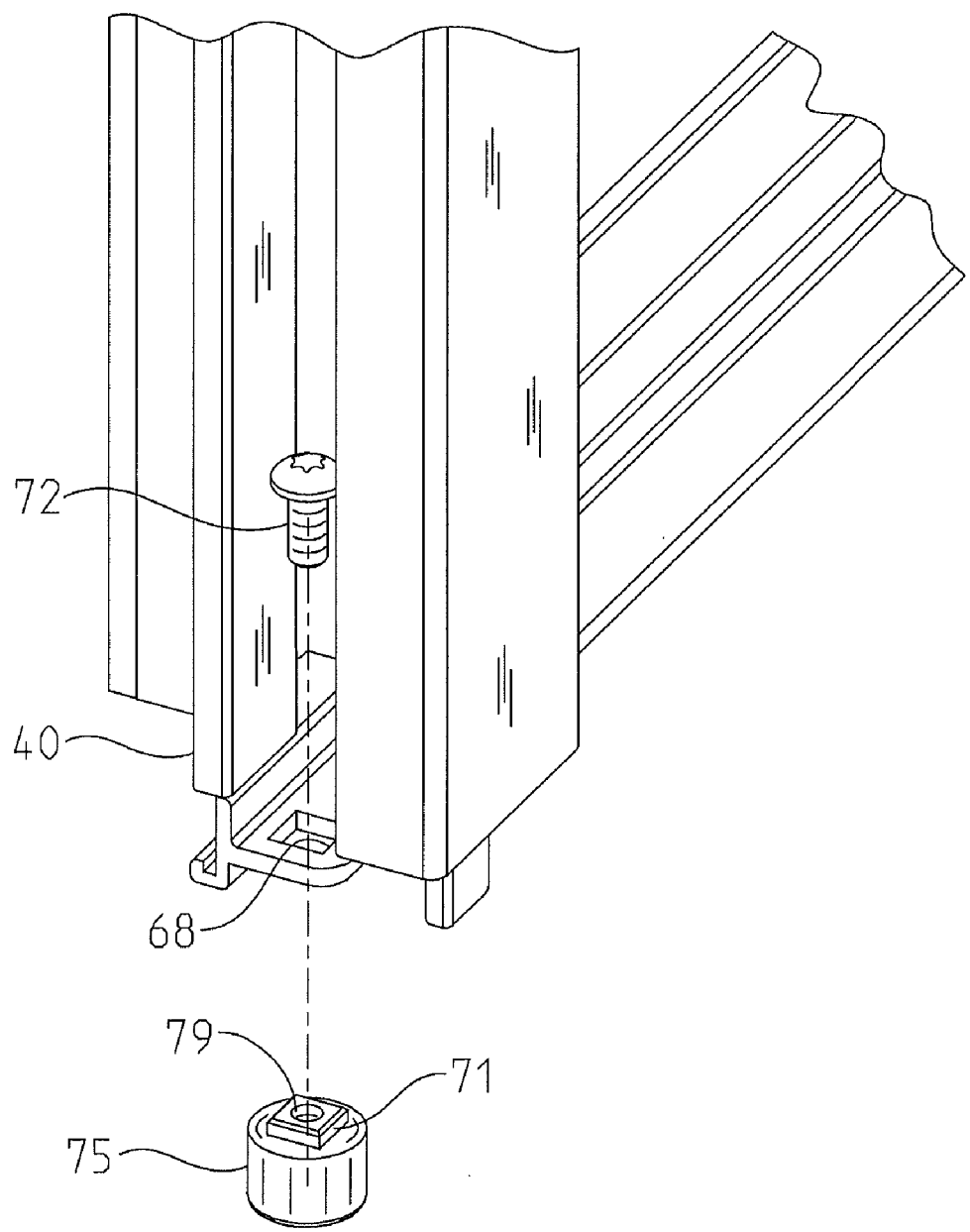
FIG. 12 is a partial cutaway perspective view of an embodiment of the sash of the sliding sub-assembly of the invention illustrating the preset slide pin of the invention.

With special reference to FIGS. 10-12, each of the slide pins 70 includes a shaft 72 with a head 75, and each is secured in a corresponding bore 68 in the surface 64 of the sash 62. The slide pins are adjustably secured in the bore to prevent axial movement of the shaft in the bore, and so that the head 75 of the shaft can be adjusted to protrude a predetermined distance from the surface 64 of the sash 62. In one embodiment, the shaft 72 includes threads 73 for receiving a lock nut 78, which defines the adjustable securing means. In another embodiment, as shown in FIG. 10, in lieu of the lock nut 78, a coil spring 76 positioned between the head 75 and the sash continuously urges the head 75 against the surface 106 inside the guide track. In the examples illustrated, a rivet nut 74 may be in combination with or in lieu of the lock nut 78. Another embodiment of the pin is the preset slide pin shown in FIG. 12, wherein the shaft 72 and the head 75 of the pin are separable. The preset pin includes a top portion 71 adapted to engage bore 68 in flush. A set screw defines the shaft 72 and is received by the bore 79 in the top shank portion 71 of the pin to define a preset height at which the frame 40 is distanced from the surface 106 inside the guide track.

Figure 3:
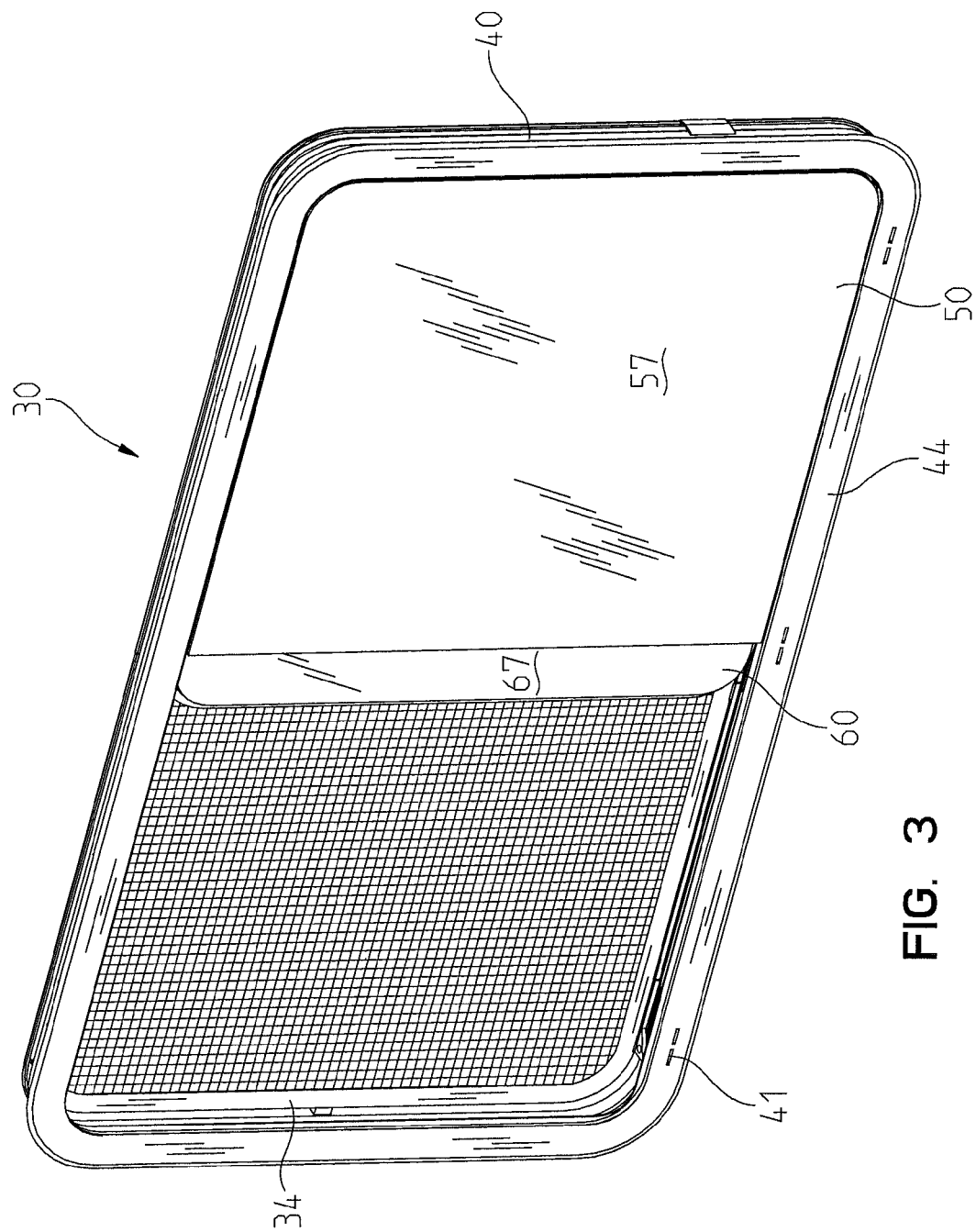
FIG. 3 is a perspective view of an embodiment of the flush closing window of the invention shown in the open offset position.
Figure 9:
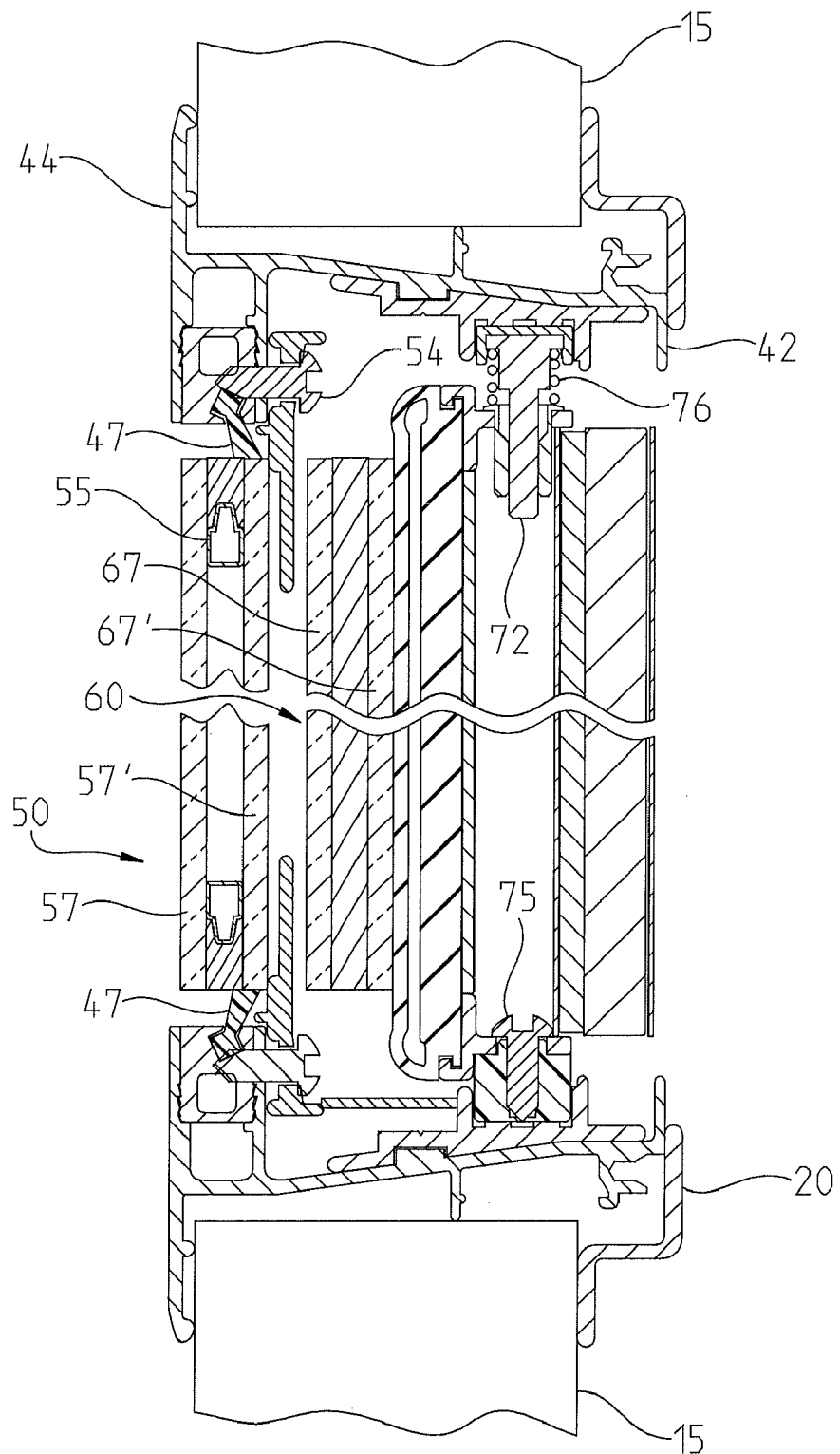
FIG. 9 is a plan cross sectional view of an embodiment of the flush-closing window of the invention showing the sliding sub-assembly in the open offset position.

The slide pins 70 engage a guide track system 100, which is secured to the interior wall of the frame member 40. With reference to FIG. 5, the guide track system 100 includes a lead guide track section 102, a tail guide track section 110, a middle guide track section 108, and an end guide track section 1112. The lead and tail sections 102, 110 of the guide track are universal for all multi-pane, flush-closing window assemblies 30 of the invention. One end of the lead guide track section 102 has an elbow channel 102b formed in it, and the tail guide track section 110 has an angled channel 110b, both of which direct movement of the sliding sub-assembly 60 relative to the fixed sub-assembly 50 between the closed flush position (FIG. 2) and the open offset position, as shown in FIGS. 3 and 9. The other end of the lead guide track section has a stop 104 with a shaped portion 105 that is shaped to mate with the head 75 of a slide pin 70. The lead and tail sections 102, 110 are formed from a rigid material such as plastic or metal and can be molded or machined using known techniques.

The middle guide track section 108 connects the stop end of the lead guide section 102 and the tail section 110 so that a slide pin 70 can move between the stop 105 and the angled channel 110b. The middle guide track section 108 and the end guide track section 112 are formed from a rigid material such as plastic, metal or the like and preferably measured and cut from the same elongated stock material to correspond to the length needed. This enables multiple slide travel lengths to be made, which reduces tooling and labor costs associated with window manufacture. Radius-cornered and square-cornered windows alike can be outfitted with the novel multi-piece track guide 100. In one embodiment, the middle and end sections 108, 112 are extruded metal.

The lead section 102, tail section 110, middle section 108, and end section 112 are each secured to the frame member 40 by removable fasteners, such as screws 111. In the preferred embodiment, mirror complements of the lead and tail sections 102, 110 and the middle and end sections 108, 112 are secured in the same manner to the opposing side of the frame member 40. Likewise, slide pins 70 are installed as described above on both sides of the sliding sub-assembly sash 62. Referring to FIGS. 10-12, two pins are installed on each side of the sash 62. More preferably, in the case where the sliding sub-assembly 60 is configured for side-to-side movement, the pins 70 having the coil spring 76 (FIG. 10) are installed on the bottom of the sash 62, and the pins 70 with the lock nut 78 shown in FIG. 11 are installed on the top.

In this manner, the head 75 of the slide pin 70 contacts a surface 106 inside a guide track system 100 on both sides of the frame member 40 to support and retain the sliding sub-assembly 60 within the frame 40 to therefore define an optimal flush fit, as shown in FIG. 2. The lock nut 78 may be adjusted on the shaft 72 during assembly to perfect the tolerances desired between the frame member 40 and the sliding sub-assembly 60 and the sliding sub-assembly and the fixed sub-assembly 50. The head 75 of the slide pins may include a plastic cover 77 to ease the sliding of the head 75 on the surface 106 of the guide track and thus prolong the life of the pin 70. In one embodiment, the shaft 72 and the head 75 are formed from plastic.

The preset pin illustrated in FIG. 12 is positioned in the bore 68 of the sash 40 with the top portion 71 of the head 75 matingly engaging the sides of the bore. The shaft 72 of the set screw 76 is tightened inside bore 79 to firmly join the shaft and the head of the pin together and to secure the head 75 against the bottom surface of the sash. The height of the head 75 therefore defines a preset height at which the frame 40 is distanced from the surface 106 inside the guide track system 100. The preset pin may be installed on the top, bottom, or sides, either alone or in combination with the other types of slide pins, as desired.

While the invention has been illustrated and described in detail in the drawings and foregoing description, the same is to be considered illustrative and not restrictive in character. It is understood that the embodiments have been shown and described in the foregoing specification in satisfaction of the best mode and enablement requirements. It is understood that one of ordinary skill in the art could readily make a nearly infinite number of insubstantial changes and modifications to the above-described embodiments, and that it would be impractical to attempt to describe all such embodiment variations in the present specification. Accordingly, it is understood that all changes and modifications that come within the spirit of the invention are desired to be protected.

What is claimed is:

1. An assembly method for a flush-closing window for a vehicle having a body enclosing a passenger compartment, the window being secured in an opening in the vehicle body by window securing structure, the method comprising:
   providing a frame member for supporting at least one fixed sub-assembly including a sash with a peripheral edge and a second sub-assembly, said frame member includes an interior side for facing the interior of the compartment and an exterior side for facing the exterior of the compartment; and
   securing said at least one fixed sub-assembly to the interior side of the frame member with removable fasteners extending through said peripheral edge, said fasteners being accessible from said interior side so that a user can conveniently secure to the frame member and remove from the frame member said fixed sub-assembly from inside the compartment without removing the frame member or the window securing structure.

2. An assembly method for a flush-closing window for a vehicle having a body enclosing a passenger compartment, the flush-closing window being secured in an opening in the vehicle body by window securing structure, the method comprising:
   providing a frame member for supporting at least one fixed sub-assembly including a sash with a peripheral edge and screws extending through said peripheral edge and a sliding sub-assembly, said frame member includes an interior side for facing the interior of the compartment and an exterior side for facing the exterior of the compartment;
   mounting a sliding sub-assembly to the interior side of said frame member with removable slide pins so that the sliding sub-assembly can move relative to the fixed sub-assembly between a closed flush position and an open offset position and so a user can conveniently mount to the frame member and remove from the frame member said sliding sub-assembly from inside the compartment without removing the frame member or the window securing structure from the vehicle; and
   securing said at least one fixed sub-assembly to the interior side of the frame member with removable fasteners, said fasteners being accessible from said interior side so a user can conveniently secure to the frame member and remove from the frame member said fixed sub-assembly from inside the compartment without removing the frame member or the window securing structure.

3. A flush-closing window for a vehicle having a body enclosing a passenger compartment, the flush-closing window being secured in an opening in the vehicle body by window securing structure, the flush-closing window comprising:
   a frame member having an interior side for facing the interior of the compartment and an exterior side for facing the exterior of the compartment;
   at least one fixed sub-assembly having a sash with a peripheral edge having screws extending through said peripheral edge, said fixed sub-assembly removably secured to the interior side of the frame member with removable fasteners, said fasteners being accessible from said interior side so that a user can conveniently secure to the frame member and remove from the frame member said fixed sub-assembly from inside the compartment without removing the window securing structure from the vehicle; and
   at least one sliding sub-assembly mounted to the interior side of said frame member with removable slide pins and capable of moving relative to the fixed sub-assembly between a closed flush position and an open offset position, said sliding sub-assembly being removable from said frame member or window securing structure from inside the vehicle compartment.

4. A flush-closing window according to claim 3, wherein said sash includes an open side, and said peripheral edge of said sash covers three sides of a pane.

5. A flush-closing window for a vehicle having a body enclosing a passenger compartment, the flush-closing window being secured in an opening in the vehicle body by window securing structure, the flush-closing window comprising:
   a frame member having an interior side for facing the interior of the compartment and an exterior side for facing the exterior of the compartment;
   at least one fixed sub-assembly removably secured to the interior side of the frame member with removable fasteners, said fasteners being accessible from said interior side so that a user can conveniently secure to the frame member and remove from the frame member said fixed sub-assembly from inside the compartment without removing the window securing structure from the vehicle; and
   at least one sliding sub-assembly mounted to the interior side of said frame member with removable slide pins and capable of moving relative to the fixed sub-assembly between a closed flush position and an open offset position, said sliding sub-assembly being removable from said frame member or window securing structure from inside the vehicle compartment, said sliding sub-assembly including a pane and a sash with an exterior surface, and each of said slide pins includes a shaft with a head, each pin is adjustably secured in a bore formed in said sash to prevent axial movement of the shaft in the bore, and so that the head of the shaft can be adjusted to protrude a predetermined distance from the surface of the sash, said head contacts a surface inside a guide track secured to the frame member to support and retain the sliding sub-assembly within the frame member to therefore define an optimal flush fit, the exterior side of said frame member and the pane of said sliding sub-assembly and said fixed sub-assembly each being in the same plane when the flush-closing window is in the closed position.

6. The flush-closing window according to claim 5, wherein a coil spring positioned between the head and the sash continuously urges the head against the surface inside the guide track so as to support and retain the sliding sub-assembly within the frame member, and to thus define said optimal flush fit.

7. A flush-closing window for a vehicle having a body enclosing a passenger compartment, the flush-closing window being secured in an opening in the vehicle body by window securing structure, the flush-closing window comprising, in combination:
- a frame member having an interior side for facing the interior of the compartment and an exterior side for facing the exterior of the compartment;
- at least one fixed sub-assembly removably secured to the interior side of the frame member with removable fasteners, said fasteners being accessible from said interior side so that a user can conveniently secure to the frame member and remove from the frame member said fixed sub-assembly from inside the compartment without disturbing the window securing structure;
- a guide track removably secured to the frame member, said guide track includes at least one lead guide track section, at least one tail guide track section, and at least one middle guide track section for connecting one end, respectively, of the lead and tail guide track sections;
- at least one sliding sub-assembly mounted to the interior side of the frame member with removable slide pins so that a user can conveniently mount to the frame member and remove from the frame member said sliding sub-assembly from inside the compartment without removing the frame member or the window securing structure from the vehicle, said sliding sub-assembly is movable between a closed flush position and an open offset position, wherein said sliding sub-assembly includes a pane and a sash with an exterior surface, and each of said slide pins includes a shaft with a head, each pin is secured in a bore formed in said sash to prevent axial movement of the shaft in the bore, and so that the head of the shaft can be adjusted to protrude a predetermined distance from the surface of the sash, said head contacts a surface inside a guide track secured to the frame member to support and retain the sliding sub-assembly within the frame member to therefore define an optimal flush fit, the exterior side of said frame member and the pane of said sliding sub-assembly and said fixed sub-assembly each being in the same plane when the flush-closing window is in the closed position.

8. The flush-closing window according to claim 7, wherein said shaft and said head are separable.

* * * * *